June 16, 1931.   J. H. ROBERTSON   1,810,059
CENTRIFUGAL GOVERNOR MECHANISM
Filed Dec. 2, 1929   4 Sheets-Sheet 1

Inventor:—
John Hogg Robertson,
By:— Smith, Michael and Gardiner,
Attorneys.

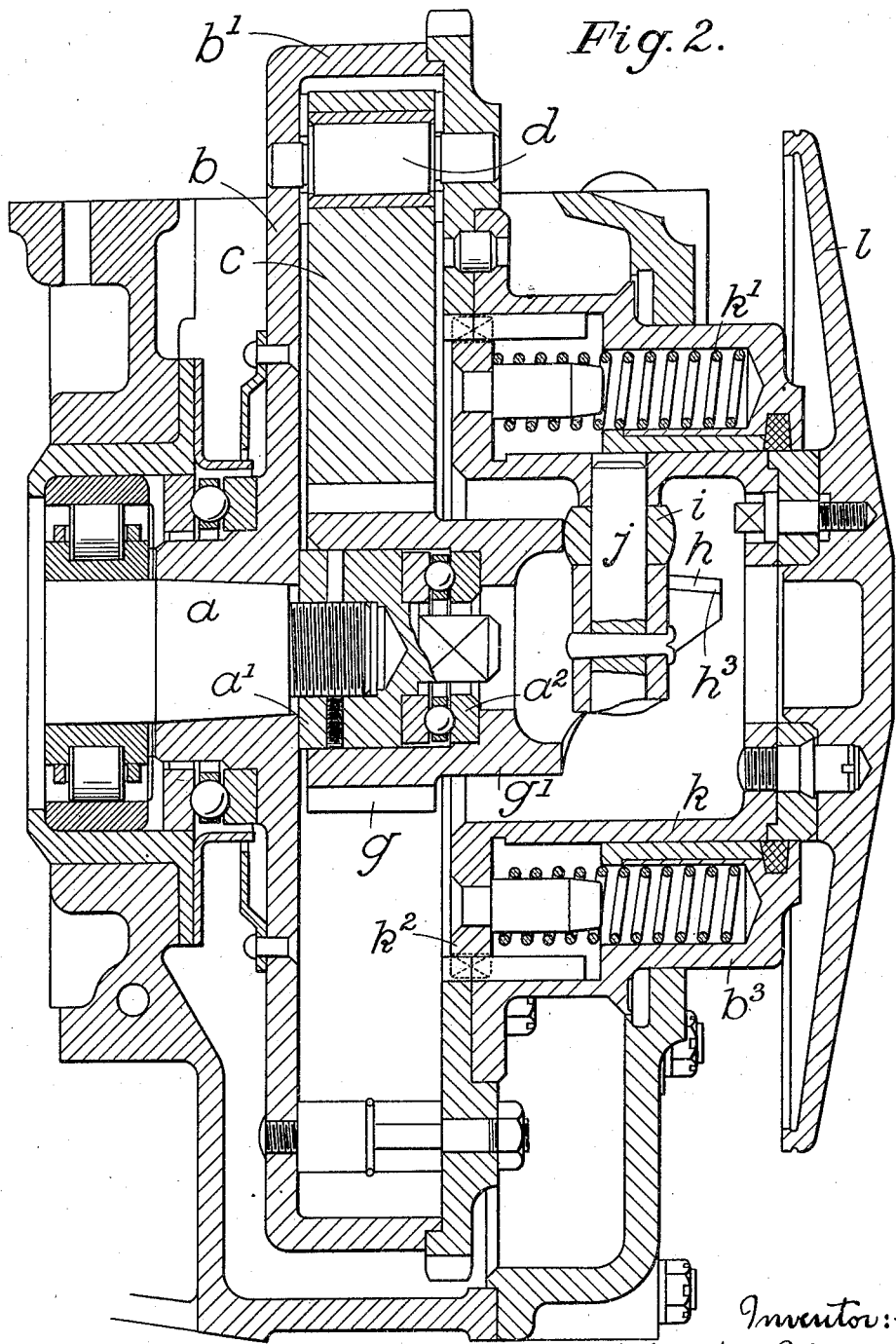

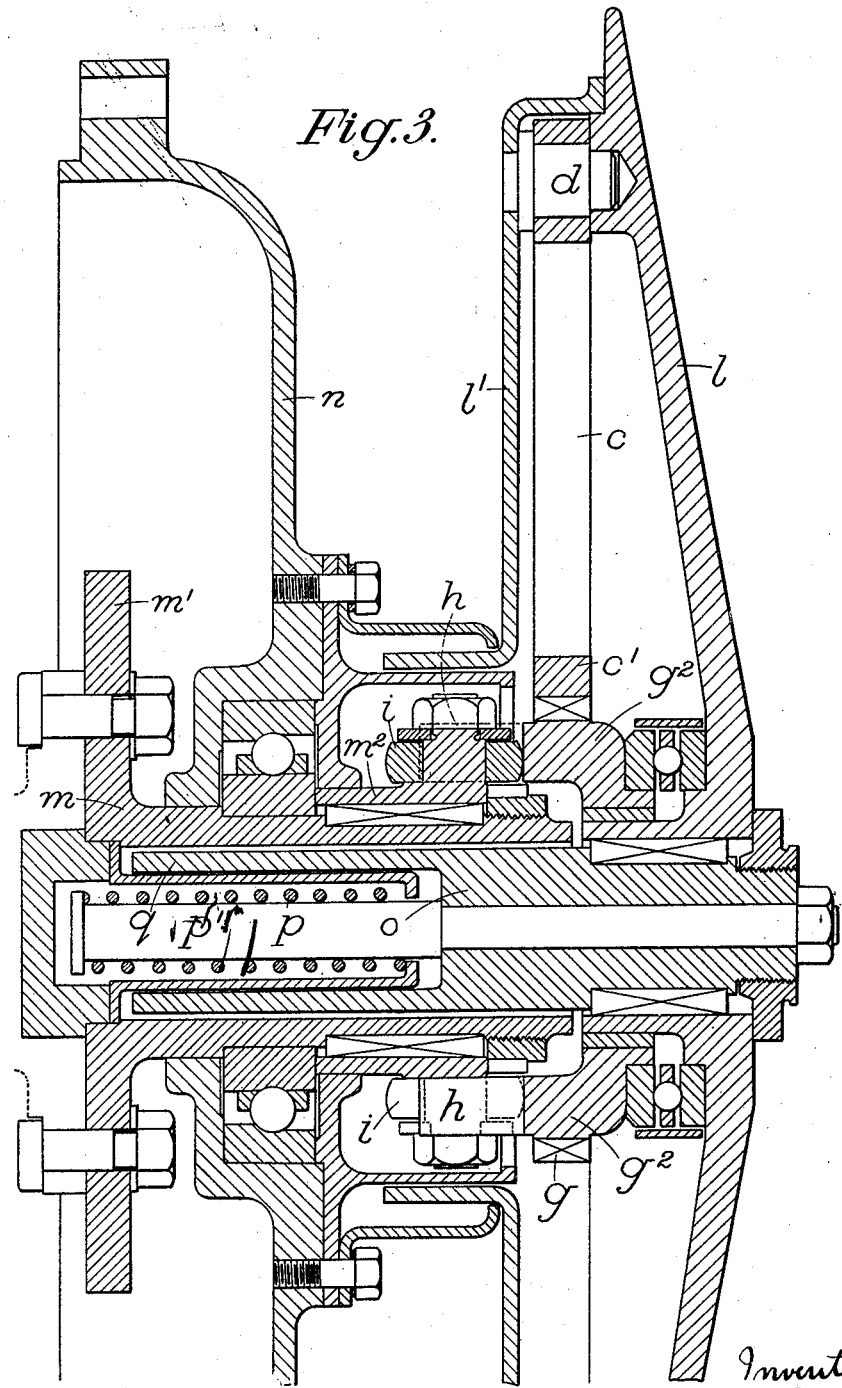

June 16, 1931.  J. H. ROBERTSON  1,810,059
CENTRIFUGAL GOVERNOR MECHANISM
Filed Dec. 2, 1929    4 Sheets-Sheet 4
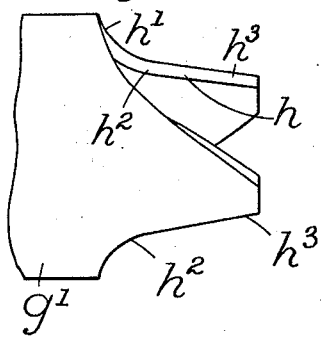
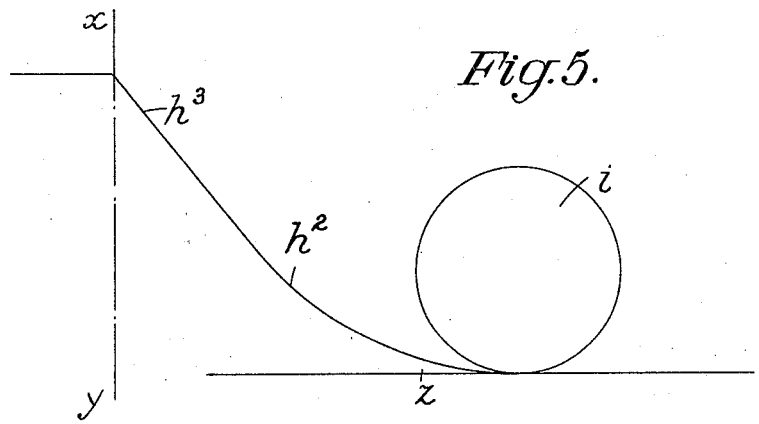

Patented June 16, 1931

1,810,059

UNITED STATES PATENT OFFICE

JOHN HOGG ROBERTSON, OF LONDON, ENGLAND

CENTRIFUGAL GOVERNOR MECHANISM

Application filed December 2, 1929, Serial No. 411,094, and in Great Britain December 19, 1928.

This invention relates to centrifugal governor mechanism of the type in which the governor weights expand in a plane perpendicular to the axis of rotation and are connected by toothed sectors to a rotatable member such as a pinion-fitted sleeve concentric with the driving shaft; the invention has for its objects to provide an improved arrangement of the parts in a mechanism of this type and also improved means for utilizing the movement of the rotatable member to control the axial displacement of a slidable driving or other member.

According to this invention, the mechanism comprises a casing, disc or other support secured upon a rotary shaft, a sleeve mounted coaxially on the said shaft, a toothed pinion formed or secured upon the sleeve, and a plurality of sector shaped levers pivoted upon the supporting disc or the like, each of the levers being weighted eccentrically so as to act as a governor weight and having a toothed segment meshing with the central pinion, so that the pivotal movement of the levers under the centrifugal effect produces rotary movement of the sleeve in relation to the shaft.

In order to convert the relative rotation of the sleeve into axial displacement of a slidable member, such as the driving disc or cone of a friction transmission gear, the rotatable sleeve is engaged between the said member and a non-slidable abutment, by means of a telescopic device including helical, spiral or other grooves, cams or the like, and co-operating studs, rollers or the like, preferably so arranged that the amount of axial displacement for a given rotation of the sleeve will vary at different points in the range.

The invention is hereafter described with reference to the accompanying drawings, in which:

Figure 2 is a cross section of the same governor mechanism applied to the control of the axially displaceable driving disc of a variable friction gearing.

Figure 3 is a similar cross section of another construction.

Figure 4 is a view of the cam surface end of the rotatable sleeve, seen at right angles to Figure 2.

Figure 5 is a development of the cam surface, on a larger scale, illustrating its relation to the cooperating roller.

Figure 1:
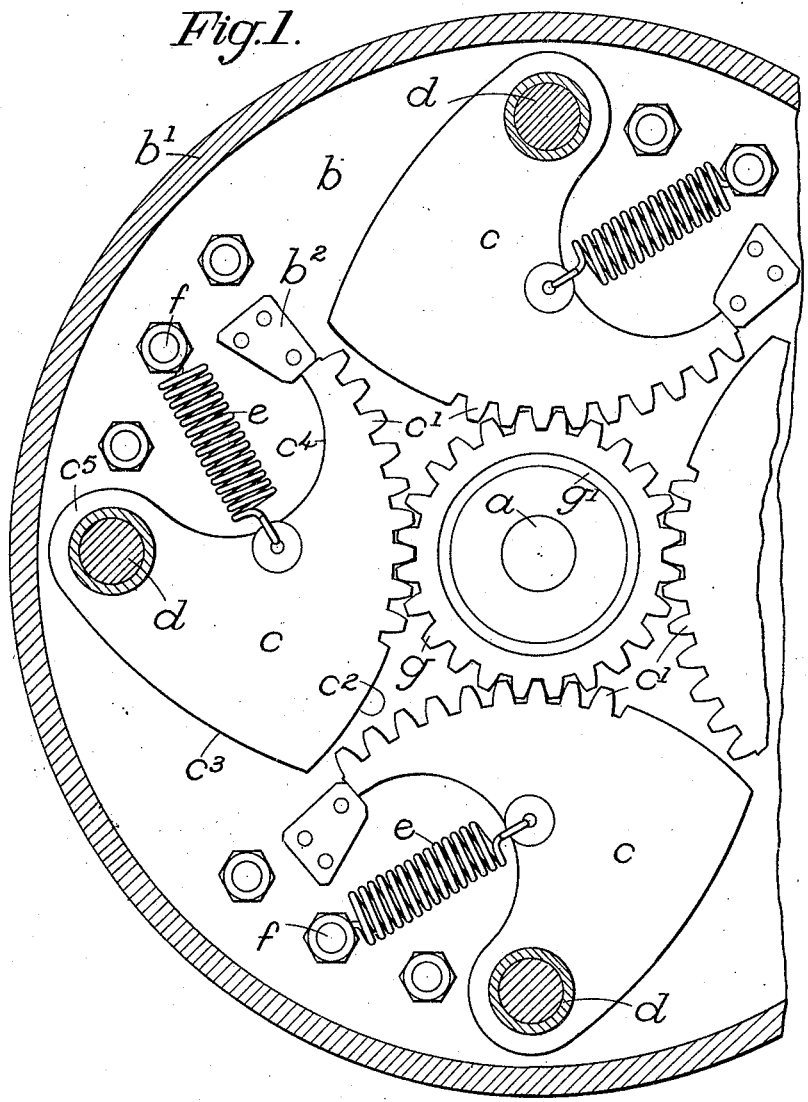
Figure 1 is an end view of the improved governor mechanism in one embodiment.

Referring to Figure 1, the driving or governor shaft $a$ is fitted with a rotary casing $b$ enclosing the weighted levers $c$ which are pivoted upon pins $d$ and controlled by springs $e$ anchored to intermediate pins $f$. The levers comprise toothed segments $c^1$ which mesh with a central pinion $g$ formed or secured upon a sleeve $g^1$; the latter being rotatable upon the governor shaft $a$.

The governor levers $c$ are shown pivoted at points $d$ directly adjacent to the flange $b^1$ of the support $b$, being shaped to a circular arc $c^2$ in continuation of their toothed segment $c^1$, an intersecting circular arc $c^3$ corresponding to the interior of the casing flange $b^1$ in the extreme outward position of the lever, and a concave semi-circular arc $c^4$ joining the pivotal boss $c^5$ to the inner edge of the toothed segmental rim $c^1$. The rim-end of each lever is adapted to abut against a stop block $b^2$ riveted to the back of the casing, in order to take the spring load off the pinion teeth in the position of rest; in the other extreme position, the levers have their arcuate faces $c^3$ in engagement with the interior of the flange $b^1$. The concave arcuate sides $c^4$ afford spaces to accommodate the controlling springs $e$ and the provision of these spaces causes the centre of gravity of each lever to lie on the other side of the line joining the axis $a$ to the pivot $d$, where the intersection of the curved sides $c^2$ and $c^3$ forms an eccentric weighted lobe subject to centrifugal force.

The rotatable sleeve $g^1$ is provided with cam surfaces $h$ of approximately helical shape, as shown clearly in Figures 2 and 4, these cam surfaces cooperating with roller-fitted studs or the like upon the slidable member to be controlled by the governor. Thus as the speed of the casing $b$ increases, the governor levers $c$ move outwardly about their pivots $d$ against the action of the restraining springs $e$, whereby the toothed segments $c^1$ are caused to rotate the sleeve $g^1$ around the shaft $a$, so that the cam-surfaces $h$ produce a corresponding axial displacement of the slidable member. It will be understood that the number of weighted levers $c$ may be as desired, three or four being preferable, as giving a balanced construction and making full use of the space available inside the casing. It will also be understood that the number and position of the levers, the spacing of the teeth upon their segments, and the number of teeth in the central pinion, must be suitably selected in order to obtain a symmetrical arrangement and even loading of the gear teeth.

Referring now to Figure 2, it will be seen that the sleeve $g^1$ is carried by a nut $a^1$ screwed upon the extremity of the driving shaft $a$, and is provided with a thrust bearing $a^2$ to take the end pressure upon the cam surfaces $h$. These cam surfaces are shown as being formed symmetrically on opposite sides of the sleeve $g^1$, so as to engage with a pair of diametrically opposite rollers $i$ (of which only one is shown) fitted on a gudgeon pin $j$ carried by a hollow plunger or outer sleeve $k$ extending axially from the hub of the driving disc $l$ and sliding telescopically in relation to the sleeve $g^1$ against the action of controlling springs $k^1$, pocketed in the front cover $b^3$ of the casing, the driving torque being transmitted from the governor shaft $a$ through the casing $b$ to the said hollow plunger or outer sleeve by means of splines engaging a toothed flange $k^2$. The shape of the cam surfaces $h$ provides an initial portion $h^1$ of little or no inclination, to allow the governor shaft $a$ to attain a minimum speed before any appreciable displacement of the disc $l$ is produced or while taking up the flexure of the disc or its mounting, an intermediate portion $h^2$ of increasing inclination, according to the torque characteristic of the engine or the like, and a final portion $h^3$ of maximum inclination which produces a rapid displacement of the disc to the direct drive position, the increasing centrifugal force upon the governor weights making up for the lower velocity ratio afforded by this part of the cam. The shape indicated may be obtained by combining a circular arc $h^2$ tangential to a roller $i$ in its initial position (see Figure 5), and of radius approximately twice that of the roller, with a helical segment $h^3$ inclined at 40 degrees to the generatrix $x$—$y$; the angle of attack $z$ will then start at about 14 degrees, as indicated in Figure 5, after the cam has taken up a disc-flexure or clearance of .0375 inch, giving an initial velocity ratio of 1:4 which decreases to approximately 1:1 at the steepest part $h^3$ of the cam. These variations in the shape of the cam-surfaces may be combined with modifications of the strength of the controlling springs $e$ and $k^1$ to suit any conditions of operation.

Figure 3 illustrates a modified construction in which the governor mechanism is arranged directly upon the driving disc of a variable friction gearing of the same type as that shown in Figure 2. In this modified arrangement, the position of the governor mechanism is reversed, the weighted levers and central pinion-fitted sleeve being carried by and slidable with the friction disc while the roller fitted-studs or the like with which the helical grooves or cam surfaces cooperate are mounted upon the governor driving shaft.

As shown in Figure 3, the engine shaft indicated in dotted lines on the left is bolted to the flange $m^1$ of a sleeve $m$ mounted upon a ball bearing in the front cover $n$ of the usual clutch-race enclosing the engine flywheel. Upon the projecting end of the sleeve $m$ there is keyed a ring $m^2$ having a pair of diametrically opposite studs or projections fitted with rollers $i$. These rollers bear against cam surfaces $h$ of approximately helical shape formed upon a ring or sleeve $g^2$ rotatably mounted upon the hub of the friction driving disc $l$; the ring or sleeve $g^2$ is integral with a central pinion $g$ which meshes with the toothed segments $c^1$ of the governor levers $c$ pivoted upon pins $d$, as in the previous construction but in this case the governor levers (of which only one is illustrated) are mounted upon the disc $l$, which carries a back plate $l^1$ to enclose the moving parts.

The drive is transmitted from the sleeve $m$ to the disc $l$ by means of a telescopic connection comprising an externally splined hollow plunger $o$ which slides inside the correspondingly internally splined sleeve $m$, the disc $l$ being keyed upon the outer end of this plunger. A spring $p$ is coiled around a bolt $p^1$ fixed in the center of the plunger, so as to be compressed between the head of the bolt and the inturned end of a thimble $q$ having its outwardly flanged opposite end engaged in a recess in the sleeve $m$. Thus the spring $p$ tends to hold the disc $l$ back towards the sleeve $m$, with the lowest part of the cam surfaces $h$ in contact with the rollers $i$, but as the speed of the driving shaft increases, the governor weights are caused to rotate the ring $g^2$ in relation to the disc $l$ and rollers $i$ so that the cam surfaces $h$ thrust the driving disc $l$ forward away from the sleeve $m$.

It will be understood that the invention is not limited to the particular constructions described nor to the combination of the governor mechanism with any specific form of variable friction gearing.

What I claim is:—

1. A centrifugal governor mechanism, comprising a rotary shaft, a supporting member secured upon said shaft, a plurality of eccentrically weighted levers pivoted upon said supporting member, each of said levers including a toothed segment concentric with the respective pivot, a toothed pinion meshing with the toothed segments of said levers, a rotatable sleeve mounted coaxially of said shaft, said toothed pinion being fast with said sleeve, a member driven by said shaft and slidable axially in relation thereto, a helical cam device adapted to produce axial displacement of said slidable member, and an outer sleeve enclosing said helical member and carrying said slidable member, said outer sleeve including an externally toothed flange and said supporting member including a correspondingly toothed interior surface meshing with said flange for positive drive of said slidable member.

2. A centrifugal governor mechanism, comprising a rotary shaft, a supporting member secured upon said shaft, a plurality of eccentrically weighted levers pivoted upon said supporting member, each of said levers including a toothed segment concentric with the respective pivot, a toothed pinion meshing with the toothed segments of said levers, a rotatable sleeve mounted coaxially of said shaft, said toothed pinion being fast with said sleeve, a member driven by said shaft and slidable axially in relation thereto, a helical cam device fast with said sleeve and adapted to produce axial displacement of said slidable member, an outer sleeve enclosing said helical member and carrying said slidable member, a transverse pin mounted diametrically in said outer sleeve, and a pair of rollers rotatable on said pin, said rollers engaging with the cam edges of said helical member.

3. A centrifugal governor mechanism, comprising a rotary shaft, a supporting member secured upon said shaft, a plurality of eccentrically weighted levers pivoted upon said supporting member, each of said levers including a toothed segment concentric with the respective pivot, a toothed pinion meshing with the toothed segments of said levers, a rotatable sleeve mounted coaxially of said shaft, said toothed pinion being fast with said sleeve, a member driven by said shaft and slidable axially in relation thereto, a non-slidable abutment upon said shaft, a helical cam device fast with said sleeve and adapted to produce axial displacement of said slidable member upon rotation of said pinion, and an end thrust bearing mounted upon said abutment, said rotatable sleeve and toothed pinion being revolubly mounted upon said end thrust bearing.

4. A centrifugal governor mechanism, comprising a rotary shaft, a supporting member secured upon said shaft, a plurality of eccentrically weighted levers pivoted upon said supporting member, each of said levers including a toothed segment concentric with the respective pivot, a toothed pinion meshing with the toothed segments of said levers, a rotatable sleeve mounted coaxially of said shaft, said toothed pinion being fast with said sleeve, said sleeve including a pair of symmetrically disposed helical cam surfaces, a pair of diametrically opposite rollers co-operating with said cam surfaces, a member driven by said shaft and slidable axially in relation thereto, and a non-slidable abutment upon said shaft, said cam surfaces and said rollers forming a telescopic thrust connection between said slidable member and said abutment, whereby axial displacement of said slidable member is produced by rotary movement of said sleeve caused by pivotal movement of said levers under centrifugal force.

5. A centrifugal governor mechanism, comprising a rotary shaft, a casing secured upon said shaft, a plurality of evenly spaced pivot pins mounted in one end of said casing, a plurality of weighted levers inside said casing, said levers being pivoted upon said pivot pins with their centers of gravity eccentric to the respective pivots and including toothed segments concentric with the respective pivots, means for controlling the outward pivotal movement of said levers under centrifugal force, a central toothed pinion meshing with said toothed segments, a rotatable sleeve mounted coaxially of said shaft and fast with said pinion, said sleeve including a pair of symmetrically disposed helical cam surfaces, an abutment for said sleeve upon said shaft, a driven member slidable in relation to said shaft, a hollow plunger fast with said driven member and slidable in the opposite end of said casing, means for transmitting the drive to said hollow plunger, a transverse pin extending diametrically of said hollow plunger, and rollers carried by said transverse pin, said rollers co-operating with said cam surfaces to produce axial displacement of said hollow plunger and said driven member as said sleeve is rotated by the pivotal movement of said levers under centrifugal force.

6. In combination with a speed-controlled variable friction gearing having an axially displaceable power-transmitting member, the axial displacement of which regulates the transmission ratio of said friction gearing, a centrifugal governor mechanism comprising a rotary casing, a plurality of evenly spaced pivot pins within and parallel to the axis of said casing, a plurality of eccentrically weighted levers mounted on said pivot pins, each of said levers including a toothed segment concentric with the respective pivot pin, a central pinion meshing with the toothed segments of said levers, a rotatable sleeve fast with said pinion, and means for converting the rotary movement of said sleeve produced by the pivotal movement of said levers under centrifugal force into axial displacement of said power-transmitting member, whereby the transmission ratio is controlled by said centrifugal governor mechanism.

In testimony whereof I have affixed my signature.

JOHN HOGG ROBERTSON.